Figure 1:
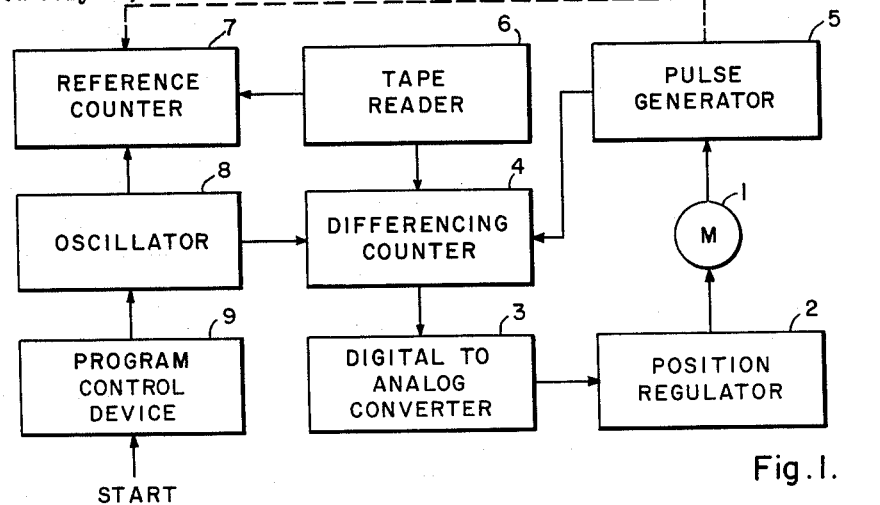

United States Patent Office 3,093,781
Patented June 11, 1963

3,093,781
DIGITAL CONTROL APPARATUS
Klaus Anke, Erlangen, Karl Ertel, Nurnberg, and Fritz Fröhr, Claus Kessler, Ingo Pritsching, and Gerhard Sinn, Erlangen, Germany, assignors to Siemens-Schuckertwerke Aktiengesellschaft, Erlangen, Germany, a corporation of Germany
Filed July 26, 1960, Ser. No. 45,396
Claims priority, application Germany July 30, 1959
6 Claims. (Cl. 318—162)

The present invention relates in general to digital control apparatus, and more particularly to digital control apparatus for positioning a machine device such as a machine tool member.

The application of digital control apparatus to control the travel and positioning of machine tools, results in considerably increased precision. The reference or desired position signal can be given in the form of a series of signal pulses, while the variable or actual position signal is produced by a pulse source directly coupled with the machine part which is to be positioned. The difference between the two series of signal pulses sets up the controlled position deviation or error signal and is applied to a position regulator which then operates correspondingly. For this purpose, the control deviation or error signal is converted by a digital-to-analog converter and is supplied to a conventional analog regulator which then controls the driving motor.

It is an object of the present invention to provide improved position control apparatus for a machine member, which apparatus is more simple in operation, less expensive and more desirable in the manner of operation with the applied control signals or pulses.

Another object of the present invention is to provide an improved procedure for digital control of the travel of a machine member by which an electric pulse with direction indication is assigned to each unit of travel position deviation and which permits the use of more simple control apparatus without the necessity to provide special apparatus for the conversion of the control signals involved.

In the operation of the present control apparatus, an electrical pulse is assigned to each unit of travel deviation for the position of the machine tool member. The reference position signal is given in a form of a decimal number and its difference from a variable desired position signal is determined by means of forward or reversible working pulse counters. A pulse supplying oscillator in conjunction with two reversible counters is used for this purpose. The value of the remainder in one of the two reversible counters determines the amount of the position deviation error and the particular counter wherein the remainder appears determines the sign or direction of the control position deviation or error.

Since the present control apparatus provides this remainder signal not by a digital computer but by simple counters, a considerably cheaper construction of the control devices results. In addition, it is possible to give the reference signals for the travel control not only on a relative basis, such as in the form of a difference from the previous reference signal, but also as an absolute value. Therefore the device according to this invention possesses a greater adaptability.

The electrical signals assigned to the unit of travel deviation for the movement of the part to be positioned are transmitted into the counter which contains the remainder in such manner that the remainder is brought down toward zero. In this way, a difference number corresponding to the position error and depending on the accuracy of the regulating device can always be left in this counter.

A first of the two counters is operative with a digital-to-analog converter which then operates the position regulator device. Thusly, when the remainder or error signal which results from the differencing operation appears in the second counter, it is transferred into the first counter by means of the pulse supply oscillator. Thereafter the new reference or desired position signal can be transferred from a tape reader to the second counter.

Should an error in the position regulating occur in the operation of the first counter, then it is necessary to make a correction by which the number corresponding to this error in position regulating is combined, with the due consideration of the algebraic plus or minus sign, to the new reference signal in the second counter.

Figure 3:
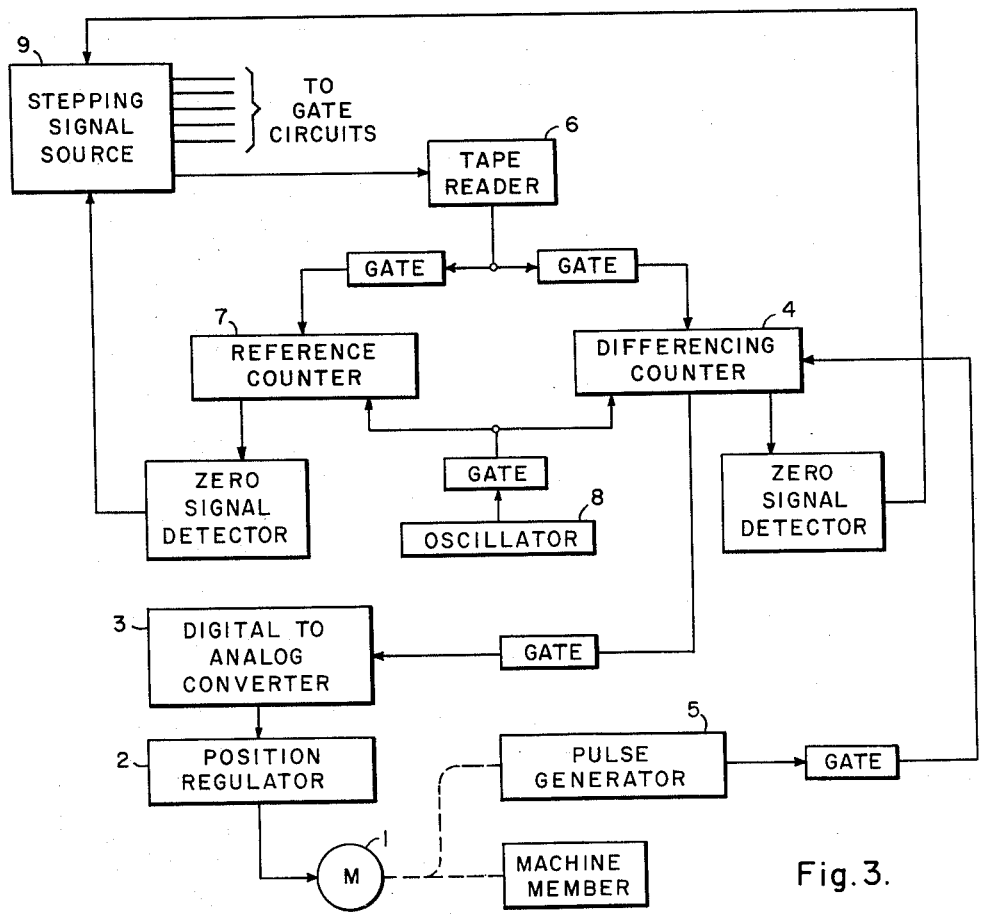
Figure 2:
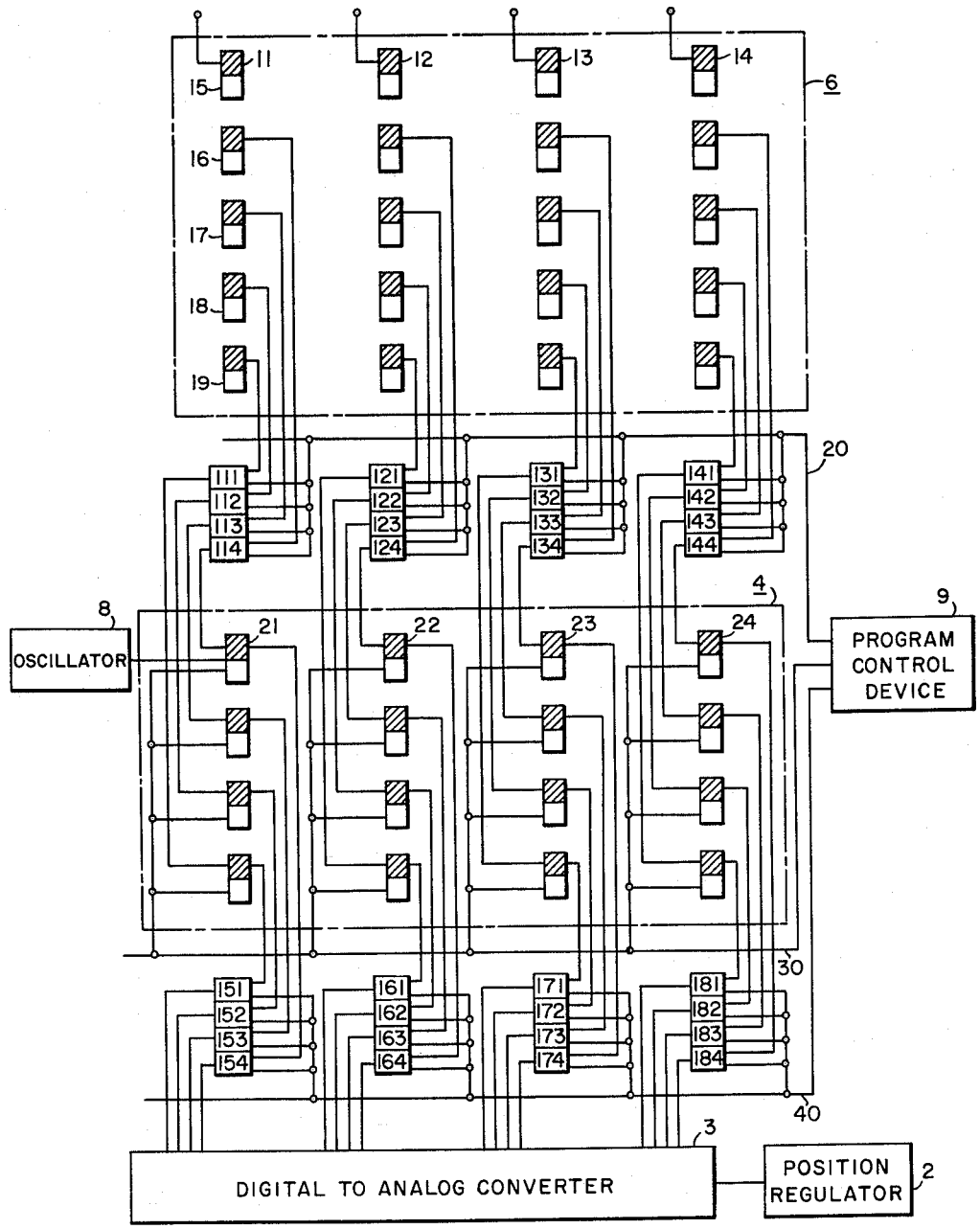

In FIG. 1 there is an illustrative showing of the present control apparatus; in FIG. 2 there is schematically shown the differencing counter arrangement of FIG. 1; and in FIG. 3 there is a diagrammatic showing of the present control apparatus.

The motor 1 is connected to the machine member to be positioned and is controlled by the position regulator 2. This position regulator is controlled from a digital-to-analog converter 3 which is operative with the first or differencing counter 4. The machine member or part to be positioned is coupled to a pulse generator 5, which produces one electric signal pulse with suitable travel direction indication for each unit of position travel deviation or change. The signal pulses are fed back to the first or differencing counter 4.

The reference or desired position signal is provided by a tape reader 6 or the like, which reference signal can be in the form of binary coded numbers with several decimal places. The information from the tape reader 6 can be transmitted into the differencing counter 4 in a parallel manner, i.e., simultaneously with several other places. A similar parallel transmission of the reference signal is also made to the second or reference counter 7.

Both of the counters 4 and 7 are supplied pulses from a suitable oscillator 8 as will be later explained. The oscillator is controlled by a programmer device or stepping signal source 9, which may be a suitable stepping switch or the like, and which serves to control the steps in the procedure, and can include a number of stages corresponding to the number of the steps in the desired procedure. As seen in FIG. 3, the outputs of zero signal detectors associated with each counter are employed to control the program control device 9, which in turn, among other functions, controls the supply of pulses from the oscillator 8 to the counters 4 and 7.

For the purpose of example, assume that the desired or reference position signal pulse number for the previous operation was 600, as supplied by the tape reader 6 to the reference counter 7. In the differencing counter 4 there might be stored a position error signal of minus 2, which results from the overall accuracy of the entire position regulating system or position control apparatus as shown in FIGS. 1 and 3.

Now, if a new desired or reference signal of 520 is supplied by the tape reader 6, the program control device 9 when started in its operation by a suitable starting signal or the like will first initiate the operation of the oscillator 8, and pulses will be supplied by the oscillator 8 to each of the reference counter 7 and the differencing counter 4 to count out the number stored in differential counter 4 to zero. After this step has been completed, the number stored in the differencing counter 4 stand at 0 and the number stored in the reference counter 7 stands at 598. By this latter operation the correction with regard to the position error in regulating operation is taken care of and the number 598 in the reference counter 7 represents the variable signal of the control.

Then, the number 520 supplied by the tape reader 6 is transferred by suitable gate circuits into the differencing counter 4 so that this latter counter 4 now contains the number 520.

The program control device 9 now causes the oscillator 8 to run again and counts out the smaller of the numbers stored in the respective counters 4 and 7 to zero. In our case, after this step has been completed, the differencing counter 4 will contain number 0, the reference counter 7 contains the number 78. The fact that the place of the remainder number 78 is reference counter 7, establishes the algebraic sign of the control deviation or error signal to be minus. If the remainder had instead been in the differencing counter 4, the algebraic sign of the error signal would be plus.

In the next step of the procedure the number 78 is transferred from the reference counter 7 into the differencing counter 4, which is again done by means of the oscillator 8 supplying pulses to count to zero the number stored in the reference counter 7 and in differencing counter 4 the number is −78. The minus sign means the control device next must work in the direction toward diminishing the previously established distance. Next, the number −78 will be transmitted by the converter 3 to the position regulator circuit 2 and thereby to actuate the motor 1.

At this time, the new reference signal 520 can be parallel transmitted from tape reader 6 into the reference counter 7 so that henceforth the reference position signal is stored in the reference counter 7.

During the position regulation the pulse generator 5 sends pulse signals corresponding to units of travel movement to the differencing counter 4 and brings the number minus 78 contained in this differencing counter 4 toward 0. As a consequence, of the overall accuracy of the position regulator system even after balancing out the regulation, an error can be present which will show up as a corresponding small number in counter 4. By this the steps in the regulating procedure connected with the chance of the reference signal are concluded.

If, instead of the new reference signal 520 of the previous example, a signal, for example, 650 were given and supplied to the differencing counter 4 then after the first step of the procedure has been concluded, the differencing counter 4 will contain the remainder 52. This remainder has a positive sign since it appears in the differencing counter, so it sets the regulator circuit in the proper direction to increase of the travel actual position setting of the machine device. The rest of the procedure will work out the same as before.

While up to now transmission of absolute reference signal was considered, it is also possible, according to further invention, to arrange regulation on a relative basis, in which the tape reader 6 will furnish only the difference between the new and the previous reference signal, by virtue of suitable storage information provided on the tape of this position difference per se in this regard.

Let us again assume that a position change from an earlier reference signal 600 to a new signal of 520 is to be made. At the relative transmission of the new reference signal the tape reader 6 will supply the position control signal or number −80. The program control device 9 now directs the parallel binary transmission of this number into the differencing counter 4. As this number already accounts for the position regulation deviation or change, it can be used immediately to operate the position regulator 2 via the digital-to-analog converter 3. The pulses transmitted by the pulse generator 5 control in this case simultaneously the counters 4 and 7 so that after balancing-out number 0 appears in counter 4 and in counter 7 appears the next value. This is of special significance when after one or two relative travel control reference signals again an absolute reference signal is to be given.

The control units indicated in the block diagram in FIG. 1 for the explanation of the procedure according to this invention, can be schematically shown, as in FIG. 2. The showing of FIG. 2 illustrates the connections between the tape reader 6, the differencing counter 4, the oscillator 8 and the digital-to-analog converter 3. The reference pulse counter 7 can be designed the same as the differencing counter 4 as far as inner construction as well as the pulse delivery is concerned and therefore is not shown.

The tape reader 6 is shown in the form of a serial reader for pick-up of four-digital, quadruple interlocked binary coded decimal numbers and contains corresponding four series of flip-flop circuits 11, 12, 13, and 14 for the respective digits of the involved control signals. Each of said series includes five bistable flip-flop circuits, which for the most significant digit series 11 are designated as 15, 16, 17, 18 and 19 respectively. In case of a serial operating tape reader, with each serial pulse, which here is transmitted at each operation, the condition of one flip-flop circuit is transferred to the next stage and so forth. The operation of the tape reader can be by means of punched cards, punched tapes or similar devices well known in this art.

The outputs of the last four stages of each series 11 to 14 are connected each to an input of mixers or gate circuits designated as 111 to 114, 121 to 124, 131 to 134, and 141 to 144. The second input of all of the latter gate circuits is connected by a common release line 20, which is connected to one stage of the programmer 9. As soon as release impulse is sent through line 20, the four-digit decimal number stored in the tape reader 6 will be parallel transmitted to the differencing counter 4 which likewise consists of four series of flip-flop circuits 21, 22, 23, 24, each with four bistable flip-flop circuits. For this purpose, each of the inputs of each set of flip-flop circuits is connected always to the output of a gate circuit. The release inputs of all flip-flop circuits are connected to a common release line 30 so that the number stored in the differencing counter 4 can be at any time released.

The rest of the binary input of all flip-flop circuits of the differencing counter 4 are connected to both inputs of always the preceeding flip-flop circuits of the differencing counter 4 are connected to both inputs of always the preceding flip-flop circuit in such manner that the forward or backward counts are possible. These connections can be made in the usual manner and are not shown in FIG. 2 in order to keep the figure clear.

The outputs of all flip-flop circuits are finally connected to a digital-to-analog converter of any conventional design. From the quantities present in counter 4 in the form of four digit decimal numbers, this converter produces input quantities for the regulator 2. Between the counter and the converter are connected again mixers or gate circuits 151–154, 161–164, 171–174, 181–184. The transmission will be made by a signal over the wire 40.

For stage by stage switching of the counters 4 and 7 we can take the necessary number of impulses from the oscillator 8 as it has been so far set forth. However, for the introduction of relatively large values into the circuit, then it may be desirable for speeding up of the individual steps of the procedure, to undertake the evaluation of the difference between the reference signal and the variable signal digit by digit and to begin at the highest or most significant decimal place. In the previously considered example, the number 520 in the counter 4 was brought by the oscillator 8 down to 0 and the number 598 in counter 7 was brought to 78. This can be obtained by sending to both counters 520 impulses from the oscillator 8. This will require a certain amount of time because of the limited impulse frequency of the oscillator 8. If this time happens to be too long, then the numbers contained in counters 4 and 7 can be compared first in the hundreds, then in the tens, and then in ones. To achieve this, the oscillator 8 sends out at first five impulses so that the hundreds in both counters are brought to 0. Then the programmer 9 changes over to the tens digit and the figure 7 will be left in the counter 7. Finally, from adjusting to the ones digit, the figure 8 is left in counter 7. Thus, a considerably smaller number of impulses is needed and correspondingly the counting off is speeded up. Then, in case of the arrangement shown in FIG. 1, the impulses from oscillator 8 have to be fed not only into first flip-flop circuit of the series 21 of the counter 4, but also into the other first stages. Also, a provision must be made for their distribution and evaluation, which will be controlled by the programmer 9.

Especially advantageous possibilities of application of the procedure according to this invention are offered for machine tools, and for the positioning of machine device slides and supports, for control of the feed of tools as well as in rolling mills for the positioning of rolls for the consecutive passes. The availability of choice between absolute and relative introduction of new reference signals makes it possible to obtain a control apparatus meeting all requirements on accuracy with relatively small expenditure.

We claim as our invention:

1. In position control apparatus for a machine member operative with a desired position signal source, the combination of a first signal counter device operative with said signal source for receiving said desired position signal, a second signal counter device operative with said signal source for receiving said desired position signal, a counting signal source operative with each of said first signal counter device and said second signal counter device for supplying counting signals to said first and second counter devices for counting down to zero at least one of said counter devices, zero signal sensing means operative with at least one of said counter devices for sensing a zero signal stored in said one counter device, means responsive to said zero signal sensing means for controlling the supply of said counting signals to the counting devices, and output means operative with said machine member and responsive to the signal stored in at least one of said counter devices for controlling the position of said machine member.

2. In position control apparatus for a machine member operative with a desired position signal source, the combination of a first reversible signal counter device operative with said signal source for receiving said desired position signal, a second reversible signal counter device operative with said signal source for receiving said desired position signal, a counting signal source operative with each of said first signal counter device and said second signal counter device for supplying counting signals to said first and second counter devices for counting down to zero one of said counter devices, zero signal sensing means operative with at least said one of said counter devices for sensing a zero signal stored in said one counter device, means responsive to said zero signal sensing means for controlling the supply of said counting signals to the counting devices, and output means operative with said machine member and responsive to the signal stored in the other of said counter devices for controlling the position of said machine member.

3. In position control apparatus for a machine member operative with a desired position signal source, the combination of a first signal counter device operative with said signal source for receiving said desired position signal, a second signal counter device operative with said signal source for receiving said desired position signal, a counting signal source operative with each of said first signal counter device and said second signal counter device for suppling counting signals to said first and second counter devices for counting down to zero at least one of said counter devices and thereby providing a difference signal between the signals stored in the respective counter devices, zero signal sensing means operative with each of said counter devices for sensing the occurrence of a zero signal stored in one of said counter device, means responsive to said zero signal sensing means for controlling the supply of said counting signals to the counting devices, and output means operative with said machine member and responsive to said difference signal stored in one of said counter devices for controlling the position of said machine member.

4. In position control apparatus for a machine member operative with a desired position signal source, the combination of a first signal counter device operative with said signal source for receiving said desired position signal, a second signal counter device operative with said signal source for receiving said desired position signal, a counting signal source operative with each of said first signal counter device and said second signal counter device for supplying counting signals to said first and second counter devices for counting down to zero at least one of said counter devices and providing a difference signal in the other counter device, zero signal sensing means operative with at least said one counter device for sensing said zero signal stored in said one counter device, means responsive to said zero signal sensing means for controlling the supply of said counting signals to the counting devices, and output means operative with said machine member and responsive to the difference signal stored in the other of said counter devices for controlling the position movement of said machine member, with said output means being responsive to which of the counter devices contains said difference signal for controlling the direction of said position movement.

5. In position control apparatus for a machine member operative with a desired position signal source, the combination of a first reversible signal counter device operative with said signal source for receiving said desired position signal, a second reversible signal counter device operative with said signal source for receiving said desired position signal, a counting signal source operative with each of said first signal counter device and said second signal counter device for supplying counting signals to said first and second counter devices for counting down to zero one of said counter devices to provide a remainder signal in the other counter device, zero signal sensing means operative with said counter devices for sensing said zero signal stored in said one counter device, means responsive to said zero signal sensing means for controlling the supply of said counting signals to the counting devices, and output means operative with said machine member and responsive to the remainder signal stored in the other of said counter devices for controlling the position of said machine member.

6. In position control apparatus for a machine member operative with a desired position signal source, the combination of an actual position signal source operative with said machine member for producing an actual position signal, a first reversible signal counter device operative with said signal source for receiving said desired position signal, a second reversible signal counter device operative with said actual position signal source for receiving said actual position signal, a counting signal source operative with each of said first signal counter device and said second signal counter device for supplying counting signals to said first and second counter devices for counting down to zero the smaller of said desired position signal and said actual position signal to provide a difference signal in one of said counter devices, zero signal sensing means operaive with at least said one of said counter devices for sensing the zero signal stored in said one counter device, means responsive to said zero signal sensing means for controlling the supply of said counting signals to the counting devices, and output means operative with said machine member and responsive to the signal stored in at least the other of said counter devices for controlling the position of said machine member.

References Cited in the file of this patent

UNITED STATES PATENTS 2,537,427    Seid et al. ---------------- Jan. 9, 1951